United States Patent
Qin et al.

(10) Patent No.: US 11,775,516 B2
(45) Date of Patent: Oct. 3, 2023

(54) MACHINE-LEARNING-BASED, ADAPTIVE UPDATING OF QUANTITATIVE DATA IN DATABASE SYSTEM

(71) Applicant: INTERNATIONAL BUSINESS MACHINES CORPORATION, Armonk, NY (US)

(72) Inventors: Ling Qin, Beijing (CN); Fu Fei Xu, Beijing (CN); Jie Zhang, Beijing (CN); Guo Dong Wan, Beijing (CN); Yi Lei Wang, Beijing (CN); Wen Jing Shi, Beijing (CN); Yuan Cao, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2 days.

(21) Appl. No.: 17/650,399

(22) Filed: Feb. 9, 2022

(65) Prior Publication Data

US 2023/0252024 A1    Aug. 10, 2023

(51) Int. Cl.
*G06F 16/245* (2019.01)
*G06N 3/08* (2023.01)
*G06F 16/25* (2019.01)
*G06F 16/2453* (2019.01)

(52) U.S. Cl.
CPC .......... *G06F 16/2453* (2019.01); *G06F 16/25* (2019.01); *G06N 3/08* (2013.01)

(58) Field of Classification Search
CPC ........ G06F 16/2453; G06F 16/25; G06N 3/08
See application file for complete search history.

(56) References Cited

U.S. PATENT DOCUMENTS

| | | | |
|---|---|---|---|
| 7,831,592 B2 | 11/2010 | Markl et al. | |
| 9,189,521 B2 | 11/2015 | Rajan et al. | |
| 10,275,504 B2 | 4/2019 | Bender | |
| 10,372,578 B2 | 8/2019 | Konik et al. | |

(Continued)

OTHER PUBLICATIONS

IBM Publication, "z/Architecture Principles of Operation," IBM® Publication No. SA22-7832-12, 13th Edition, Sep. 2019 (pp. 1-2000).

(Continued)

*Primary Examiner* — Hares Jami
(74) *Attorney, Agent, or Firm* — Teddi Maranzano, Esq.; Kevin P. Radigan, Esq.; HESLIN ROTHENBERG FARLEY & MESITI P.C.

(57) ABSTRACT

Machine-learning-based, adaptive updating of quantitative data in a database system is provided, which includes training one or more machine learning models to facilitate adaptively updating quantitative data in the database system, and ascertaining an update urgency index for updating the quantitative data for one or more data structures of the database system. The update urgency index is representative of an urgency for updating the quantitative data for the data structure(s) and is based, at least in part, on real-time query metrics. The machine learning model(s) is used to adaptively update the quantitative data, where the adaptively updating is based, at least in part, on the ascertained update urgency index. Processing of a database query is optimized in the database system using the adaptively updated quantitative data.

15 Claims, 12 Drawing Sheets

(56) References Cited

U.S. PATENT DOCUMENTS

| | | | |
|---|---|---|---|
| 2006/0149695 A1* | 7/2006 | Bossman | G06F 16/221 |
| | | | 706/48 |
| 2007/0143851 A1* | 6/2007 | Nicodemus | H04L 63/1433 |
| | | | 726/4 |
| 2016/0292232 A1* | 10/2016 | Konik | G06F 11/3466 |
| 2020/0042522 A1* | 2/2020 | Zait | G06N 20/00 |
| 2020/0125545 A1* | 4/2020 | Idicula | G06F 16/217 |
| 2020/0210387 A1* | 7/2020 | Brown | G06N 5/04 |
| 2021/0303575 A1* | 9/2021 | Butterstein | G06F 16/24545 |
| 2021/0406717 A1* | 12/2021 | Tauheed | G06N 5/04 |
| 2023/0237333 A1* | 7/2023 | Shao | G06F 18/00 |
| | | | 706/25 |

OTHER PUBLICATIONS

Mel et al., "The NIST Definition of Cloud Computing," National Institute of Standards and Technology, Information Technology Laboratory, Special Publication 800-145, Sep. 2011 (pp. 1-7).

* cited by examiner

| ACCESS PLAN | FIRST EXECUTIONS | LATEST EXECUTIONS |
|---|---|---|
| SIGNIFICANT DIFFERENCE BETWEEN ESTIMATED AND ACTUAL EXECUTIONS INDICATES QUANTITATIVE DATA PROBABLY OUTDATED | | |
| ESTIMATED # RETURNED ROWS R1 | AVG ACTUAL # RETURN ROWS R2 | AVG ACTUAL # RETURN ROWS R3 |
| ESTIMATED CPU TIME C1 | ACTUAL CPU TIME C2 | ACTUAL CPU TIME C3 |

FIG. 4

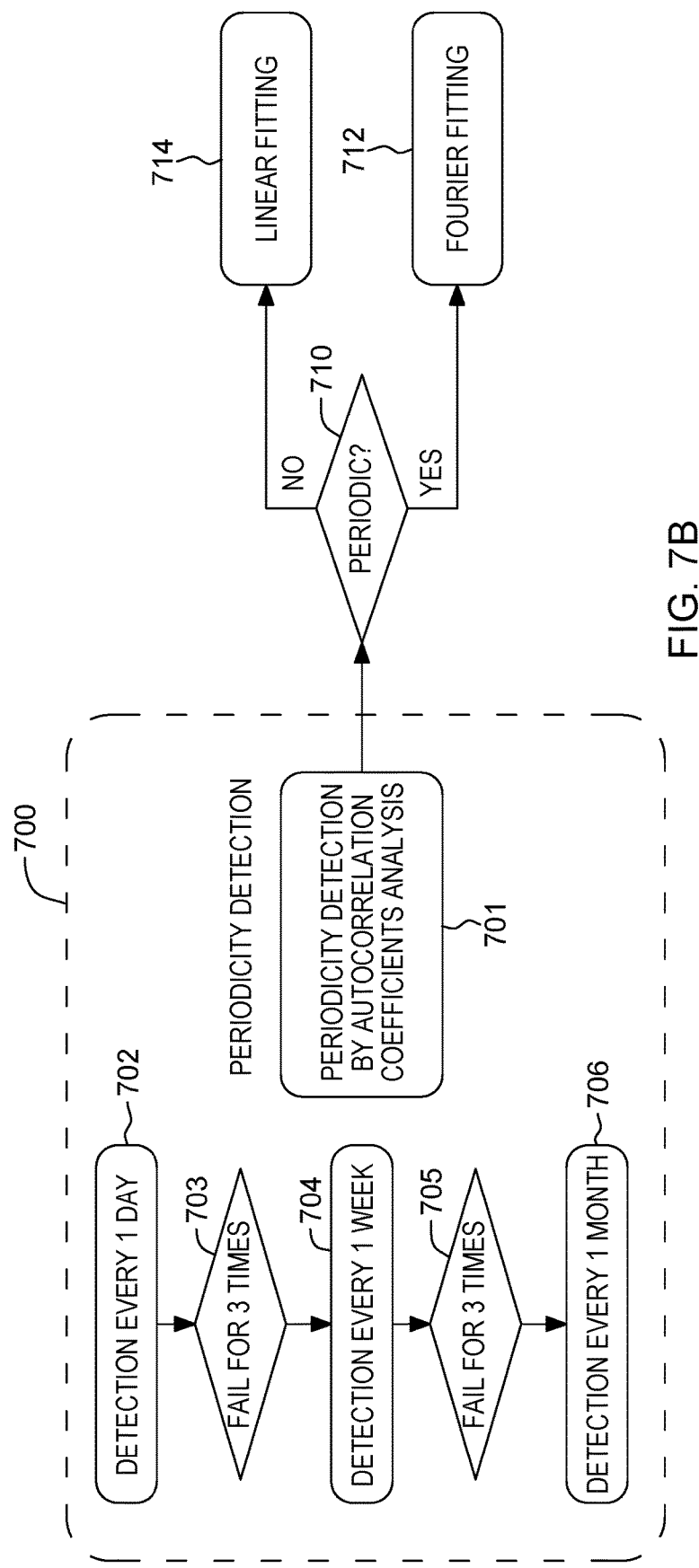

| Table | 1. Attributes ||| 2. Observed Results ||| Decision |
| --- | --- | --- | --- | --- | --- | --- | --- |
| | Urgency | Table level Heat || What's up when update data? || When Not Update? | |
| | UUI (Quantitative data Update Urgency Index) Range | Data Reads/s | Data Writes/s Completed Activities /s Database heat | ① Average Execution time of related SQLs decreased after quantitative data update? | ② No Major TPS drop during quantitative data update? | ③ TPS dropped? | Update quantitative data ? |
| T1 | RangeA23 | RangeB7 | RangeC5 RangeD10 | Yes | Yes | N/A | Yes |
| T1 | RangeA18 | RangeB15 | RangeC21 RangeD18 | Yes | Neutral | N/A | Yes |
| T2 | RangeA5 | RangeB3 | RangeC15 RangeD15 | No | Neutral | N/A | No |
| T2 | RangeA21 | RangeB3 | RangeC15 RangeD23 | Yes | No | N/A | No |
| T2 | RangeA13 | RangeB15 | RangeC23 RangeD11 | No | No | N/A | No |
| T3 | RangeA21 | RangeB15 | RangeC19 RangeC12 | N/A | N/A | Yes | Yes |
| T3 | RangeA11 | RangeB3 | RangeC15 RangeD15 | N/A | N/A | No | No |

FIG. 8

MACHINE-LEARNING-BASED, ADAPTIVE UPDATING OF QUANTITATIVE DATA IN DATABASE SYSTEM

BACKGROUND

One or more aspects relate, in general, to facilitating processing within a computing environment, and in particular, to improving such processing.

Database management systems, such as relational database management systems, use an optimizer component that transforms structured query language (SQL) queries or statements into executable code. In one or more embodiments, the optimizer is configured to, for instance, estimate the number of rows that qualify for each prediction, and to select an algorithm which most efficiently accesses the required data. In one embodiment, the query optimizer generates one or more query plans for each query, each of which may be a mechanism used to run the query. The query optimizer generates the query plan(s) using applicable quantitative data for the data structures of the database system.

SUMMARY

Certain shortcomings of the prior art are overcome and additional advantages are provided through the provision, in one or more aspects, of a computer program product for facilitating processing within a computing environment. The computer program product includes one or more computer-readable storage media having program instructions embodied therewith. The program instructions are readable by a processing circuit to cause the processing circuit to perform a method which includes training one or more machine learning models to facilitate adaptively updating quantitative data in a database system, and ascertaining an update urgency index for updating quantitative data for one or more data structures of the database system. The update urgency index is representative of an urgency for updating the quantitative data for the data structure(s) and is based, at least in part, on real-time query metrics. The method further includes adaptively updating, using the machine learning model(s), the quantitative data. The adaptively updating is based, at least in part, on the ascertained update urgency index. Further, the method includes optimizing processing of a database query in the database system using the adaptively updated quantitative data.

Computer systems and computer-implemented methods relating to one or more aspects are also described and claimed herein. Further, services relating to one or more aspects are also described and may be claimed herein.

Additional features and advantages are realized through the techniques described herein. Other embodiments and aspects of the invention are described in detail herein and are considered a part of the claimed aspects.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 4 depicts one example of a data structure useful in ascertaining a difference between estimated query execution and actual query execution as an indicator of whether quantitative data is outdated, in accordance with one or more aspects of the present invention;

FIG. 7A depicts an example table obtained (in one embodiment) by averaging execution time for query executions within an execution sequence for use in identifying a data structure with query execution performance that is trending poor, in accordance with one or more aspects of the present invention;

FIG. 7B depicts one embodiment of a workflow illustrating periodicity detection using autocorrelation coefficients analysis to facilitate identifying a linear fitting or Fourier fitting case for use in predicting a query execution time to facilitate predictively identifying a data structure with query execution performance that is trending poor, in accordance with one or more aspects of the present invention;

FIG. 8 depicts one embodiment of an exemplary decision tree for a machine learning model, for use in ascertaining, based at least in part on an update urgency index, whether quantitative data is to be currently updated, in accordance with one or more aspects of the present invention;

DETAILED DESCRIPTION

Figure 1A:
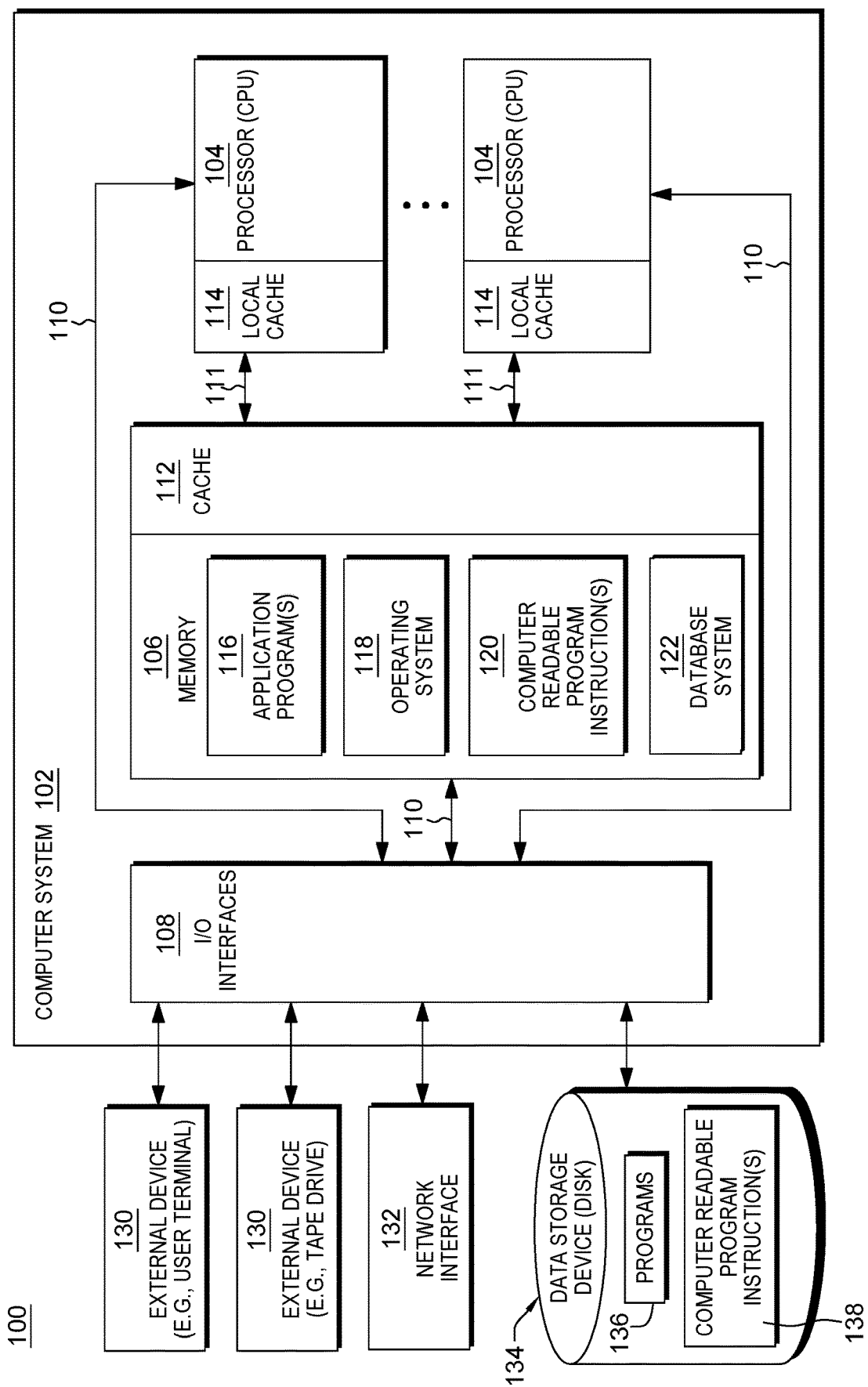
FIG. 1A depicts one example of a computing environment to incorporate and use one or more aspects of the present invention.

The accompanying figures, in which like reference numerals refer to identical or functionally similar elements throughout the separate views, and which are incorporated in and form a part of this specification, further illustrate the present invention and, together with the detailed description of the invention, serve to explain aspects of the present invention. Note in this regard that descriptions of well-known systems, devices, database systems, processing techniques, etc., are omitted so as to not unnecessarily obscure the invention in detail. It should be understood, however, that the detailed description and this specific example(s), while indicating aspects of the invention, are given by way of illustration only, and not limitation. Various substitutions, modifications, additions, and/or other arrangements, within the spirit or scope of the underlying inventive concepts will be apparent to those skilled in the art from this disclosure. Note further, that numerous inventive aspects and features are disclosed herein, and unless inconsistent, each disclosed aspect or feature is combinable with any other disclosed aspect or feature as desired for a particular application of the concepts disclosed herein.

Note also that illustrative embodiments are described below using specific code, designs, architectures, database systems, protocols, layouts, schematics or tools, only as examples, and not by way of limitation. Further, the illustrative embodiments are described in certain instances using particular hardware, software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

As understood by one skilled in the art, program code, as referred to in this application, can include both hardware and software. For example, program code in certain embodiments of the present invention can include fixed function hardware, but other embodiments can utilize a software-based implementation of the functionality described. Certain embodiments combine both types of program code. One example of program code, also referred to as one or more programs or program instructions, is depicted in FIG. 1A as one or more of application program(s) 116, computer-readable program instruction(s) 120, and/or database system 122, stored in memory 106 of computer system 102, as well as programs 136 and computer-readable program instruction(s) 138, stored in a data storage device 134 accessed by computer system 102.

One embodiment of a computing environment to incorporate and use one or more aspects of the present invention is described with reference to FIG. 1A. As an example, the computing environment is based on the IBM® z/Architecture® instruction set architecture, offered by International Business Machines Corporation, Armonk, New York. One embodiment of the z/Architecture instruction set architecture is described in a publication entitled, "z/Architecture Principles of Operation", IBM Publication No. SA22-7832-12, Thirteenth Edition, September 2019, which is hereby incorporated herein by reference in its entirety. The z/Architecture instruction set architecture, however, is only one example architecture; other architectures and/or other types of computing environments of International Business Machines Corporation and/or of other entities may include and/or use one or more aspects of the present invention. z/Architecture and IBM are trademarks or registered trademarks of International Business Machines Corporation in at least one jurisdiction.

Referring to FIG. 1A, a computing environment 100 includes, for instance, a computer system 102 shown, e.g., in the form of a general-purpose computing device. Computer system 102 can include, but is not limited to, one or more general-purpose processors or processing units 104 (e.g., central processing units (CPUs)), a memory 106 (a.k.a., system memory, main memory, main storage, central storage or storage, as examples), and one or more input/output (I/O) interfaces 108, coupled to one another via one or more buses and/or other connections. For instance, processors 104, and memory 106 are coupled to I/O interfaces 108 via one or more buses 110, and processors 104, are coupled to one another and memory 106 via one or more buses 111.

Bus 111 is, for instance, a memory or cache coherence bus, and bus 110 represents, e.g., one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Note that one or more special-purpose processors (e.g., AI accelerators or neural network accelerators) (not shown) can be separate from but coupled to the one or more general-purpose processors 104 and/or can be embedded within one or more general-purpose processors 104. Many variations are possible.

Memory 106 can include, for instance, a cache 112, such as a shared cache, which may be coupled to local caches 114 of processors 104 via, e.g., one or more buses 111. Further, memory 106 can include one or more programs or applications 116 and at least one operating system 118. An example operating system includes an IBM® z/OS® operating system, offered by International Business Machines Corporation, Armonk, New York. z/OS is a trademark or registered trademark of International Business Machines Corporation in at least one jurisdiction. Other operating systems offered by International Business Machines Corporation and/or other entities may also be used. Memory 106 can also include one or more computer readable program instructions 120, which can be configured to carry out functions of embodiments of aspects of the invention.

Moreover, in one or more embodiments, memory 106 includes a database system 122, and processor firmware (now shown). Processor firmware includes, e.g., the microcode or millicode of a processor. It includes, for instance, the hardware-level instructions and/or data structures used in implementation of higher level machine code. In one embodiment, it includes, for instance, proprietary code that is typically delivered as microcode or millicode that includes trusted software, microcode or millicode specific to the underlying hardware and controls operating system access to the system hardware.

Computer system 102 can communicate via, e.g., I/O interfaces 108 with one or more external devices 130, such as a user terminal, a tape drive, a pointing device, a display, and one or more data storage devices 134, etc. A data storage device 134 can store one or more programs 136, one or more computer readable program instructions 138, and/or data, etc. The computer readable program instructions can be configured to carry out functions of embodiments of aspects of the invention.

Computer system 102 can also communicate via, e.g., I/O interfaces 108 with network interface 132, which enables computer system 102 to communicate with one or more networks, such as a local area network (LAN), a general wide area network (WAN), and/or a public network (e.g., the Internet), providing communication with other computing devices or systems.

Computer system 102 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples, include, but are not limited to: microcode or millicode, device drivers, redundant processing units, external disk drive arrays, RAID systems, tape drives, and data archival storage systems, etc.

Computer system 102 can be operational with numerous other general-purpose or special-purpose computing system environments or configurations. Examples of well-known computing systems, environments, and/or configurations that are suitable for use with computer system 102 include, but are not limited to, personal computer (PC) systems, server computer systems, thin clients, thick clients, handheld or laptop devices, multiprocessor systems, microprocessor-based systems, network PCs, minicomputer systems, mainframe computer systems, and distributed cloud computing environments that include any of the above systems or devices, and the like.

Figure 1B:
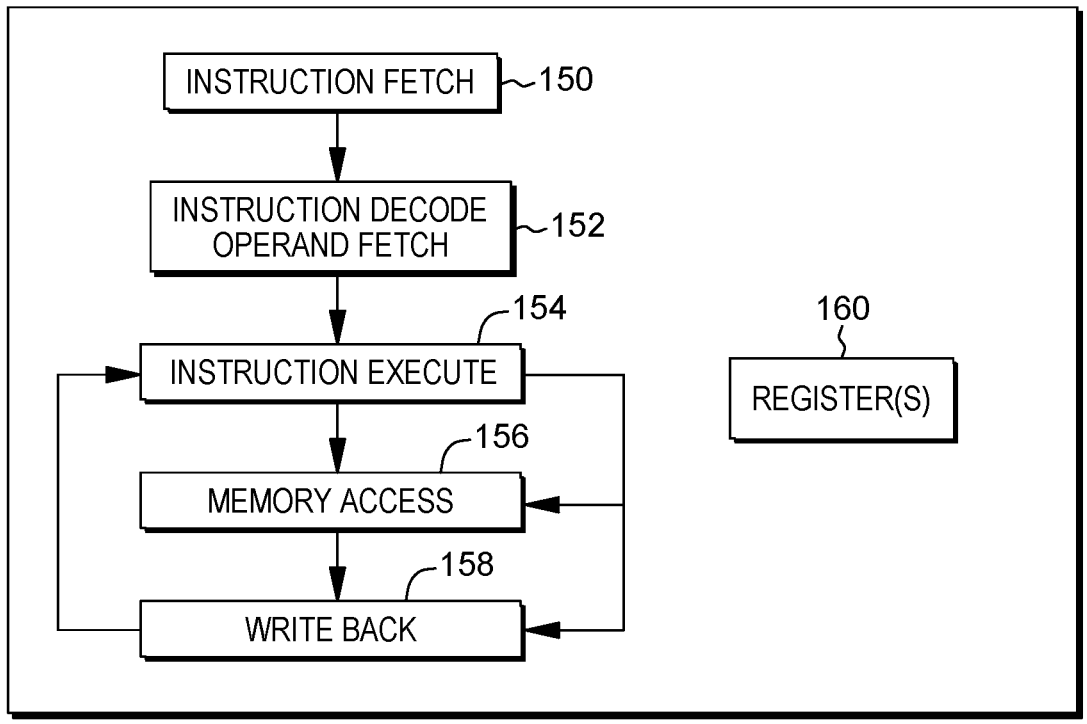
FIG. 1B depicts further details of a processor of FIG. 1A, in accordance with one or more aspects of the present invention.

In one example, a processor (e.g., processor 104) includes a plurality of functional components (or a subset thereof) used to execute instructions and/or operations. As depicted in FIG. 1B, these functional components include, for instance, an instruction fetch component 150 to fetch instructions to be executed; an instruction decode unit 152 to decode the fetched instructions and to obtain operands of the decoded instructions; one or more instruction execute components 154 to execute the decoded instructions; a memory access component 156 to access memory for instruction execution, if necessary; and a write back component 158 to provide the results of the executed instructions. One or more of the components can access and/or use one or more registers 160 in instruction processing.

Figure 1C:
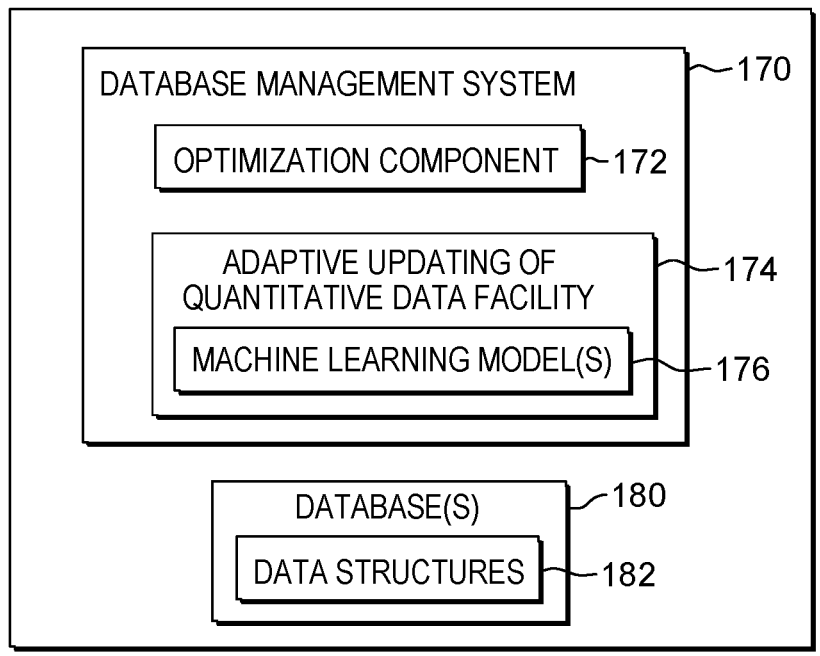
FIG. 1C depicts further details of a database system of FIG. 1A, in accordance with one or more aspects of the present invention.

In one or more implementations, a database system (e.g., database system 122 of FIG. 1A) includes a database management system 170 and one or more databases 180, such as depicted in FIG. 1C. In one embodiment, database management system 170 includes an optimization component 172 (or optimizer) for optimizing database query processing to reduce database system response time, and an adaptive updating of quantitative data facility 174 implementing, for instance, one or more aspects disclosed herein, and including one or more machine learning models 176. At a high level, database performance refers to the rate at which database management system 170 supplies information from one or more data structures 182 of database(s) 180 based on queries. The query optimizer component analyzes, in one embodiment, structured query language (SQL) queries, and determines the efficient execution mechanisms within the database(s) 180. Optimization component 172, or query optimizer, generates one or more query plans for each query, each of which can be a mechanism used to run a query within the database system.

There are a variety of database systems and database management systems available. In one or more database embodiments, a data structure 182, or table, is a logical structure made up of rows and columns. Rows have no fixed order, and so when data is retrieved, it might need to be sorted. The order of the columns is the ordered specified when the data structure is created. At the intersection of every column and row is a specific data term called a value, or an atomic value, accessed by a structured query language (SQL) query.

Quantitative data provides the optimizer component with accurate information for selecting an optimal query access plan for the database. Accurate quantitative data is needed for optimal database query processing in a database system. The database system typically provides a user with a utility to collect quantitative data or information for use by the optimizer component. For instance, a Db2® database is a family of data management products, including database servers, developed by International Business Machines Corporation. (Db2 is a registered trademark of IBM in at least one jurisdiction.) A Db2 database is a relational database that delivers data management and analytics capabilities for transactional workloads. In the Db2 environment, RUNSTATS is a Db2 utility that scans, for instance, a table space or indexes to gather quantitative data or information about space utilization and index efficiency. The information gather is stored in the Db2 system tables and used by the SQL optimizer as quantitative data to select a best-access path during a query bind process.

In one or more implementations, the quantitative data utility in the database system can have the ability to update information automatically. Automatic quantitative data collection typically occurs in one of two ways, either as real-time quantitative data collection (such as at statement compile time, or information can be fabricated by using certain metadata), or as background quantitative data collection (for instance, at fixed intervals).

Existing automatic quantitative data collection solutions can degrade database system performance, and are often not used in practice. For instance, when based on a data change ratio, the automatic collection of information does not take into account real-time workload considerations, and can result in unnecessary quantitative data collection, which wastes system resources. An approach which is predefined and fixed in time proceeds without considering real-time database system states, and can cause resource contention between quantitative data collection and normal database system workload. Another approach is to collect quantitative data at regular intervals, which can at times delay the database system from gaining better performance by not having available timely updated statistics.

Disclosed herein are computer program products, computer systems, and computer-implemented methods which facilitate processing within a computing environment by adaptively updating quantitative data in the database system. In one or more implementations, to evaluate a quantitative data collection requirement, the update facility not only takes data changes into account, but also considers real-time query metrics, such as real-time data accesses or selections, and query and/or system performance data. In this manner, quantitative data is collected for one or more data structures (or tables) that have significant data changes, or where query performance is poor, or predicted to be poor soon. The predicted performance can be ascertained via one or more machine learning models trained to predict when performance is degrading due to outdated quantitative data. In one or more embodiments, the prediction can be based on different regression algorithms and a result of periodicity detection, considering history and dynamic performance metrics of real workloads in the database system. Using a machine learning model, such as a decision tree model, the adaptive update facility determines whether to currently collect quantitative data for one or more data structures, and ensures, in one embodiment, that needed quantitative data updates are executed soon, while non-urgent quantitative data updates are handled, for instance, during an idle time frame in the database system, or a less busy timeframe in the database system. In this manner, updating of quantitative data adaptively occurs when necessary, such as above an urgency threshold, due to the quantitative data or statistics requirement being evaluated accurately, with an automatic optimization ability being applied. The updating of the quantitative data is also run at the correct time, such as when query performance is poor, or where query performance is predicted to be poor in the near future, or at a time when executing the update will have little influence on one or more executing database system applications.

In one or more embodiments, computer program products, computer systems, and computer-implemented methods are provided for facilitating processing within a computing environment, and in particular, within a computing environment including a database system. In one or more embodiments, the method includes training one or more machine learning models to facilitate adaptively updating quantitative data in the database system, and ascertaining an update urgency index for updating quantitative data for one or more data structures of the database system. The update urgency index is representative of a current urgency for updating the quantitative data for the data structure(s) and is based, at least in part, on real-time query metrics. The method includes adaptively updating, using the machine learning model(s) the quantitative data, where the adaptively updating is based, at least in part, on the ascertained update urgency index. Further, the method includes optimizing processing of a database query in the database system using the adaptively updated quantitative data.

In one embodiment, the real-time query metrics include a volume and frequency of database queries to the data structure(s) in the database system.

In one or more implementations, the real-time query metrics are based, at least in part, on collecting M top-most database queries to the data structure(s) in order of processor usage for a time interval, and estimating therefor a deviation in usage from an estimated processor usage for the M top-most database queries, the estimated deviation being representative of a performance deviation of the M top-most database queries, where $M \geq 1$.

In one or more implementations, the method further includes predicting, via the machine-learning model(s), an execution time of one or more database queries to the data structure(s), where the real-time query metrics are based on a difference between the predicted execution time of the one or more database queries to the data structure(s) in comparison to an actual execution time of the one or more database queries to the data structure(s). In one embodiment, the difference between the predicted execution time of the one or more database queries to the data structure(s) and the actual execution time of the one or more database queries to the data structure(s) exceeding a threshold predicts poor query performance, and increases the update urgency index to indicate and urgency for updating the quantitative data of the data structure(s) in the database system. In one embodiment, the predicting, by the machine learning model(s) the execution time for the one or more database queries uses regression analysis based on time-series data.

In one or more embodiments, the adaptively updating includes adaptively updating the quantitative data based on a relative urgency of the ascertained update urgency index, where the adaptively updating includes currently proceeding with updating of the quantitative data when the ascertained update urgency index indicates updating of the quantitative data is urgent, and delaying proceeding with updating of the quantitative data where the ascertained update urgency index indicates that the updating is not urgent, or less urgent.

In one or more embodiments, the method further includes identifying a list of data structures for which the update urgency index is to be ascertained, where the one or more data structures is in the list of data structures, and the list of data structures includes any data structure with major data changes since the last updating of the quantitative data, any data structure with no quantitative data, and any data structure with stale quantitative data. In one or more embodiments, the method further includes predictively identifying, by the machine learning model(s), a data structure in the database system with degrading query execution performance, wherein the list of data structure(s) further includes the predictively identified data structure with degrading query execution performance.

Figure 2:
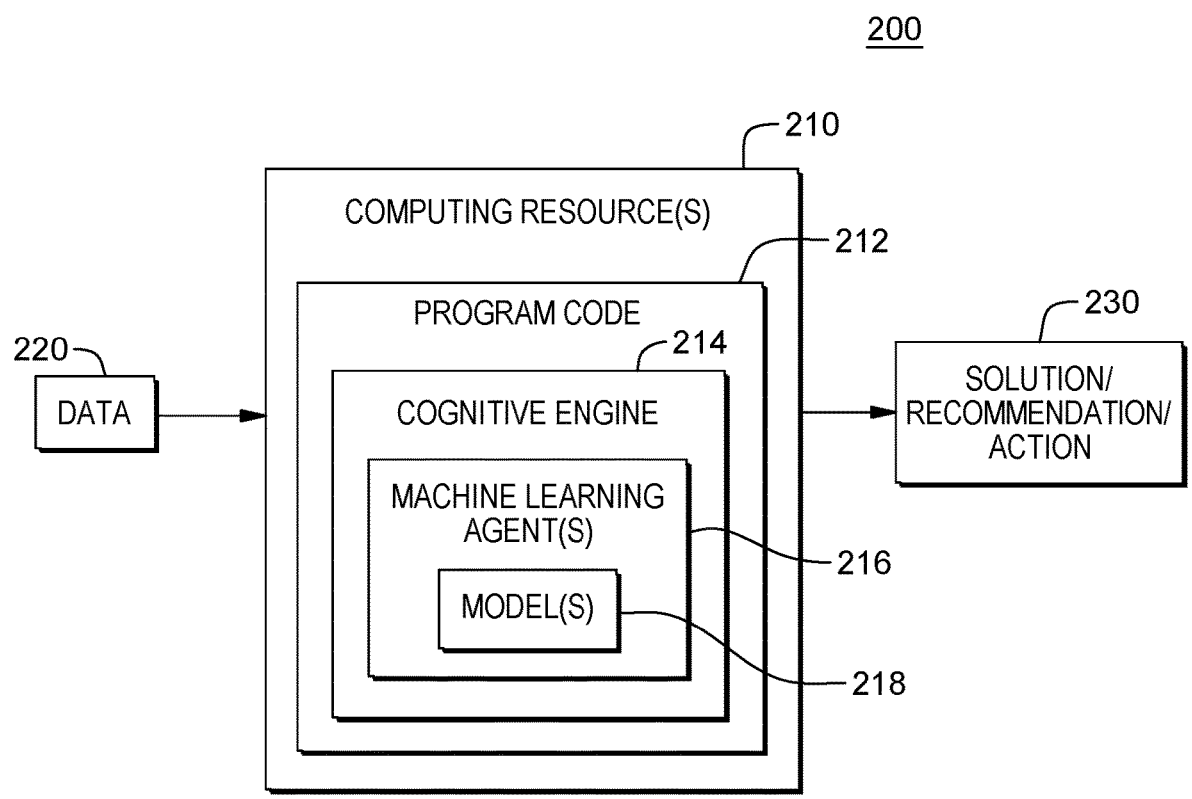
FIG. 2 illustrates another example of a computing environment to incorporate and user one or more aspects of the present invention.

FIG. 2 depicts a further embodiment of a computing environment or system 200, incorporating, or implementing, certain aspects of an embodiment of the present invention. In one or more implementations, system 200 can be part of a computing environment, such as computing environment 100 described above in connection with FIG. 1. System 200 includes one or more computing resources 210 that execute program code 212 that implements, for instance, an adaptive updating of quantitative data facility, and includes a cognitive engine 214, which has one or more machine-learning agents 216, and one or more machine-learning models 218. Data 220, such as the data metrics discussed herein, is used by cognitive engine 214, to train model(s) 218, to (for instance) predict query performance degradation in the database system, and to generate one or more update actions 230, etc., based on the particular application of the machine-learning model. In implementation, system 200 can include, or utilize, one or more networks for interfacing various aspects of computing resource(s) 210, as well as one or more data sources providing data 220, and one or more systems receiving the decision to adaptively update the quantitative data for one or more data structures in the database (based, e.g., on a predicted query performance degradation) and/or other output update action, etc., 230 of machine-learning model(s) 218. By way of example, the network can be, for instance, a telecommunications network, a local-area network (LAN), a wide-area network (WAN), such as the Internet, or a combination thereof, and can include wired, wireless, fiber-optic connections, etc. The network(s) can include one or more wired and/or wireless networks that are capable of receiving and transmitting data, including training data for the machine-learning model, predicted traffic event and an output solution, recommendation, action, of the machine-learning model, such as discussed herein.

In one or more implementations, computing resource(s) 210 houses and/or executes program code 212 configured to perform methods in accordance with one or more aspects of the present invention. By way of example, computing resource(s) 210 can be a computing-system-implemented resource(s). Further, for illustrative purposes only, computing resource(s) 210 in FIG. 2 is depicted as being a single computing resource. This is a non-limiting example of an implementation. In one or more other implementations, computing resource(s) 210, by which one or more aspects of machine-learning processing such as discussed herein are implemented, could, at least in part, be implemented in multiple separate computing resources or systems, such as one or more computing resources of a cloud-hosting environment, by way of example.

Briefly described, in one embodiment, computing resource(s) 210 can include one or more processors, for instance, central processing units (CPUs). Also, the processor(s) can include functional components used in the integration of program code, such as functional components to fetch program code from locations in such as cache or main memory, decode program code, and execute program code, access memory for instruction execution, and write results of the executed instructions or code. The processor(s) can also include a register(s) to be used by one or more of the functional components. In one or more embodiments, the computing resource(s) can include memory, input/output, a network interface, and storage, which can include and/or access, one or more other computing resources and/or databases, as required to implement the machine-learning processing described herein. The components of the respective computing resource(s) can be coupled to each other via one or more buses and/or other connections. Bus connections can be one or more of any of several types of bus structures, including a memory bus or a memory controller, a peripheral bus, an accelerated graphics port, and a processor or local bus, using any of a variety of architectures. By way of example, but not limitation, such architectures can include the Industry Standard Architecture (ISA), the micro-channel architecture (MCA), the enhanced ISA (EISA), the Video Electronic Standard Association (VESA), local bus, and peripheral component interconnect (PCI). As noted, examples of a computing resource(s) or a computer system(s) which can implement one or more aspects disclosed herein are described further herein with reference to FIG. 1, as well as with reference to FIGS. 9A-11.

As noted, program code 212 executes, in one implementation, a cognitive engine 214 which includes one or more machine-learning agents 216 that facilitate training one or more machine-learning models 218. The machine-learning models are trained using training data that can include a variety of types of data, depending on the model and the data sources. In one or more embodiments, program code 212 executing on one or more computing resources 210 applies machine-learning algorithms of machine-learning agent 216 to generate and train the model(s), which the program code then utilizes to predict, for instance, a query performance degradation in a database, and depending on the application, to perform an action (e.g., provide a solution, make a recommendation, perform a task, etc.). In an initialization or learning stage, program code 212 trains one or more machine-learning models 218 using obtained training data that can include, in one or more embodiments, real-time query metrics, such as described herein.

Training data used to train the model (in embodiments of the present invention) can include a variety of types of data, such as data generated by one or more database management system components or utilities, in communication with the computing resource(s). Program code, in embodiments of the present invention, can perform machine-learning analysis to generate data structures, including algorithms utilized by the program code to predict and/or perform a machine-learning action. As known, machine-learning (ML) solves problems that cannot be solved by numerical means alone. In this ML-based example, program code extract features/attributes from training data, which can be stored in memory or one or more databases. The extracted features are utilized to develop a predictor function, h(x), also referred to as a hypothesis, which the program code utilizes as a machine-learning model. In identifying machine-learning model 218, various techniques can be used to select features (elements, patterns, attributes, etc.), including but not limited to, diffusion mapping, principal component analysis, recursive feature elimination (a brute force approach to selecting features), and/or a random forest, to select the attributes related to the particular model. Program code can utilize a machine-learning algorithm to train machine-learning model (e.g., the algorithms utilized by program code), including providing weights for conclusions, so that the program code can train any predictor or performance functions included in the machine-learning model. The conclusions can be evaluated by a quality metric. By selecting a diverse set of training data, the program code trains the machine-learning model to identify and weight various attributes (e.g., features, patterns) that correlate to enhanced performance of the machine-learned model.

Some embodiments of the present invention can utilize IBM Watson® as learning agent. IBM Watson® is a registered trademark of International Business Machines Corporation, Armonk, New York, USA in one or more jurisdictions. In embodiments of the present invention, the respective program code can interface with IBM Watson® application program interfaces (APIs) to perform machine-learning analysis of obtained data. In some embodiments of the present invention, the respective program code can interface with the application programming interfaces (APIs) that are part of a known machine-learning agent, such as the IBM Watson® application programming interface (API), a product of International Business Machines Corporation, to determine impacts of data on the machine-learning model, and to update the model, accordingly. In one or more embodiments, program code of the present invention can utilize and/or tie together multiple existing artificial intelligence (AI) applications.

In one or more embodiments of the present invention, the program code can utilize a decision tree approach such as described herein, and/or a neural network to analyze training data and/or collected data to generate an operational machine-learning model.

Neural networks are a programming paradigm which enable a computer to learn from observational data. This learning is referred to as deep learning, which is a set of techniques for learning in neural networks. Neural networks, including modular neural networks, are capable of pattern (e.g., state) recognition with speed, accuracy, and efficiency, in situations where datasets are mutual and expansive, including across a distributed network, including but not limited to, cloud computing systems. Modern neural networks are non-linear statistical data modeling tools. They are usually used to model complex relationships between inputs and outputs, or to identify patterns (e.g., states) in data (i.e., neural networks are non-linear statistical data modeling or decision-making tools). In general, program code utilizing neural networks can model complex relationships between inputs and outputs and identified patterns in data. Because of the speed and efficiency of neural networks, especially when parsing multiple complex datasets, neural networks and deep learning provide solutions to many problems in multi-source processing, which program code, in embodiments of the present invention, can utilize in implementing a machine-learning model, such as described herein.

Figure 3:
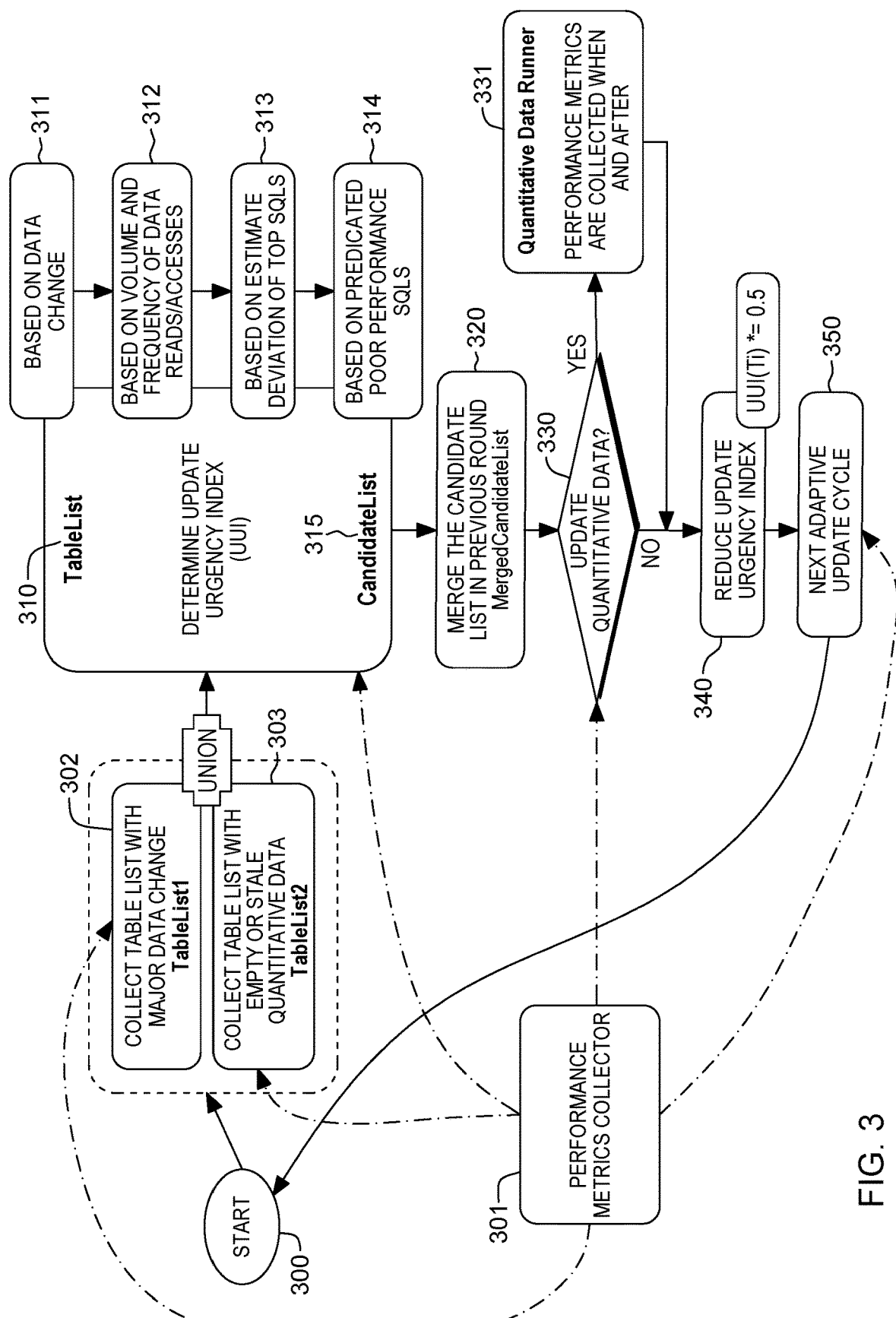
FIG. 3 depicts one embodiment of a workflow illustrating certain aspects of one or more embodiments of the present invention.

By way of further explanation, FIG. 3 depicts one embodiment of a workflow illustrating certain aspects of one or more embodiments of the present invention. In one or more implementations, the illustrated workflow is implemented by an adaptive updating of quantitative data facility, such as described herein.

As discussed, disclosed herein is an adaptive facility for updating quantitative data, or statistics, for particular data structures in a database system, when needed in real-time. For instance, in one or more embodiments, quantitative data updating is triggered when query performance to a particular data structure is poor, or is predicted by the system to be degrading towards poor performance. Further, in one or more implementations, quantitative data updating can be selectively delayed when less urgent to be executed when it will not effect performance of one or more database system applications. As described herein, quantitative data is updated adaptively in a database based on real-time query performance, and in a manner such that the quantitative data is updated automatically at the correct time for performance of the database system. For instance, quantitative data can be identified for updating where query performance is poor for one or more data structures, and actually updated at a time when the updating will have little influence on one or more other executing database applications.

In the workflow example of FIG. 3, adaptive updating starts 300, using a performance metrics collector 301, with collection of one or more lists of data structures, referred to as TableLists. In FIG. 3, this includes collecting a TableList1 302 with data structures having major data changes since the associated quantitative data was last updated, and collecting another TableList2 303 with empty associated quantitative data, or stale associated quantitative data. The union of TableList1 and TableList2 provides a TableList 310 of data structures for which an update urgency index is to be ascertained, in accordance with one or more aspects disclosed herein.

As a specific example, collecting TableList1 302 and TableList2 303 to form TableList 310 can include:
Collect TableList with Major Data Change 301
  Define Configurable Parameter:
    X=Data Change Ratio Threshold
  Steps:
    1. Collect insert/update/delete (IUD) Ratio for all data structures or tables (T):

$$\text{IUD\_Ratio}(Ti) = \frac{\text{IUD\_Counter}(Ti)}{\text{Number\_of\_Rows}(Ti)}$$

2. Collect all tables (T) having IUD_Ratio>=X %:

TableList1={T1',T2', ... Ta'}

Collect Table List with Empty or Stale Quantitative Data 302
  Define Configurable Parameter Y:
    Y=Quantitative data collected Y days before is Stale (e.g., 10 days)
  Steps:
    1. Collect all tables (T) with last update date that is NULL, or where last update date—current data>=Y days TableList2={T1",T2", ... Tb"}

Form the TableList 310 Union as:

TableList=TableList1∪TableList2={T1,T2, ... Tn}

With TableList 310, an update urgency index (UUI) is obtained for updating quantitative data for each data structure in the TableList, using one or more query metrics. As illustrated, the query metrics can include metrics based on data change 311, metrics based on real-time volume and frequency of data reads or accesses 312, metrics on estimated real-time deviation of top (CPU time) SQL queries from anticipated execution time 313, and real-time predicted poor performance of SQL queries for one or more data structures in the TableList 314. In one or more specific embodiments, determining the update urgency index considers all four metrics, and is based on a determined IUD ratio, as follows:
Calculate Quantitative Data Update Urgency Index (UUI) based on IUD Ratio
  Define Configurable Parameter CP1:
    CP1=Credit Points for Data Change
  Steps:
    1. For each table Ti in TableList {T1, T2, ... Tn}, collect IUD Ratio:

$$\text{IUD\_Ratio}(Ti) = \frac{\text{IUD\_Counter}(Ti)}{\text{Number\_of\_Rows}(Ti)}$$

If IUD_Ratio(Ti)<X %: IUD_Ratio(Ti)=0

2. Sum of IUD ratios for TableList:

$$\text{SUM\_IUDRatio} = \sum_{i=1}^{n} (\text{IUD\_Ratio}(Ti))$$

3. For each table Ti in TableList {T1, T2, ... Tn}, determine UUI—Update Urgency Index $$UUI(Ti) = \frac{CP1}{\text{SUM\_ID\_Ratio}} * \text{IUD\_Ratio}(Ti)$$

4. Get candidate list 315 of data structure(s) with associated UUIs:

CanditateList={(T1,UUI(T1)),(T2,UUI(T2)), ... (Tn, UUI(Tn))}

In addition, determining the quantitative data update urgency index includes, in one embodiment, redetermining the update urgency index for the data structure(s) based on volume and frequency of data reads or accesses 312. By way of example, one embodiment of this includes:
Recalculate Update Urgency Index—based on volume and frequency of data reads 312
  Define Configurable Parameter CP2:
    CP2—Credit Points for Data Reads
  Steps:
    1. For each table Ti in CandidateList 315, collect:
      TotalPages(Ti)=Total number of pages of Ti
      PageReads(Ti)=Number of page reads of Ti $$\text{PageReadsRatio}(Ti) = \frac{\text{PageReads}(Ti)}{\text{TotalPages}(Ti)}$$

NumberAccess(Ti)=Number of times table Ti was accessed
    2.

$$\text{TotalPageReadsRatio} = \sum_{i=1}^{n} (\text{PageReadsRatio}(Ti))$$

3.

$$TotalAccesses = \sum_{i=1}^{n} (numberAccess(Ti))$$

4. Recalculate Update Urgency Index (UUI) for table Ti:

$$UUI(Ti)+ = \frac{CP2*0.5}{TotalPageReadsRatio} * PageReadsRatio(Ti) + \frac{CP2*0.5}{TotalAccesses} * numberAccess(Ti)$$

5. Get updated CandidateList:

CandidateList={(T1,UUI(T1),(T2,UUI(T2)), . . . (Tn, UUI(Tn))}

In the embodiment of FIG. 3, the update urgency index (UUI) can be further qualified by redetermining the index based on, for instance, an estimated performance deviation of the top M SQL queries to the data structures in the TableList. In one embodiment, this can include:
Define Configurable Parameters:
  M=Top M SQLs by CPU usage (where M≥1)
  CP3=Credit Points for Top SQLs
Steps:
  1. Collect Top M SQLs order by CPU usage:

CurTopSQLList={SQL1,SQL2, . . . SQLy}

2. As illustrated in FIG. 4, and as discussed below, collect R1, R2, R3, C1, C2, C3 for each SQLi in CurTopSQLList:
  SQLi(R1, R2, R3, C1, C2, C3)
  3. Calculate Estimated Deviation for SQLi $$EstDeviation(SQLi) = \frac{\left(\frac{SQLi(R2)}{SQLi(R1)} - \frac{SQLi(R3)}{SQLi(R1)}\right)^2 + \left(\frac{SQLi(C2)}{SQLi(C1)} - \frac{SQLi(C3)}{SQLi(C1)}\right)^2}{4}$$

4. For each table Tj in TableList, determine its Accumulative Estimated Deviation:

If Ti is referenced in SQLi: AccumEstDeviation(Tj)+=EstDeviation(SQLi)

5. For each data structure Tk in TableList, recalculate its Update Urgency Index $$UUI(Tk)+ = \frac{CP3}{\sum_{h=1}^{n} (AccumEstDeviation(Th))} * AccumEstDeviation(Tk)$$

6. Get updated CandidateList 315:

CandidateList={(T1,UUI(T1),(T2,UUI(T2)), . . . (Tn, UUI(Tn)))

With reference to Step 3 above and FIG. 4, in one example, the adaptive update facility determines whether there is a significant difference between estimated and actual query executions that would be indicative of quantitative data being outdated. For instance, as illustrated in FIG. 4, the optimizer component produces, in one embodiment, an access plan which includes an anticipated number of returned rows R1, and an anticipated CPU usage time C1 for one or more SQL queries to the data structure being considered. In a first actual execution of the SQLs, the average number of returned rows R2 is determined, along with the actual CPU time C2 for the queries. This process can be repeated for the latest execution(s), obtaining an average actual number of returned rows R3, and an actual CPU time C3, for the executions, which can then be used in the process discussed above to obtain the estimated deviations of the top-most SQLs (in terms of CPU usage) and based thereon, to update the CandidateList 315 UUIs.

Figure 5:
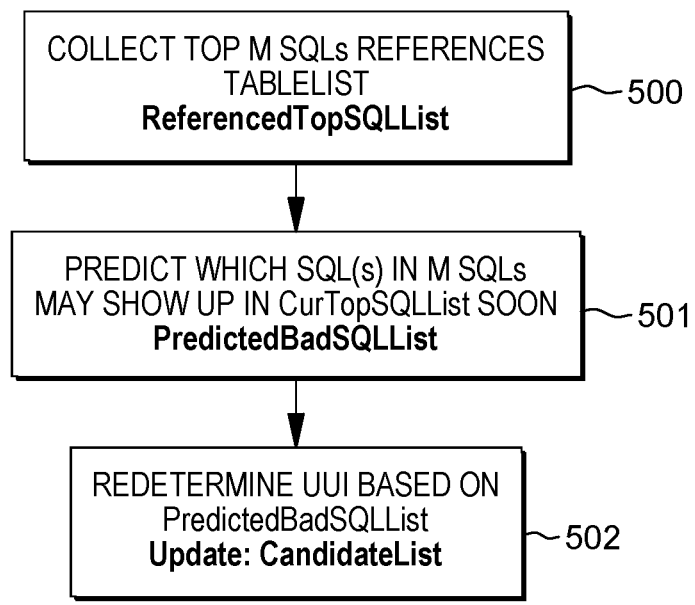
FIG. 5 depicts one embodiment of a workflow for determining a real-time query metric based on a difference between predicted and actual execution time of one or more queries to a data structure, in accordance with one or more aspects of the present invention.

In the embodiment of FIG. 3, the update urgency index (UUI) can further be qualified by redetermining the index based on, for instance, predicted poor performance SQLs 314. In particular, the machine learning model(s) is trained, in one embodiment, to predictively identify SQLs that are trending towards poor performance, and thus to indicate the need for updated quantitative data for the data structures at issue. In one embodiment, this can include:
Define Configurable Parameters:
  Z=A difference between predicted and actual execution time>Z % indicates potential bad performance;
  CP4=Credit Points for Predicted Top SQLs
Steps: As indicated in FIG. 5, the process can include in one embodiment:
  1. Collecting Top M SQLs, references any table in TableList, and not in current top SQLs, and has a least 1 execution in each 5 minutes period, get: ReferencedTopSQLList 500
  2. Predict which SQL(s) in ReferencedTopSQLList 500 likely meet bad performance issue 501:
  For each SQL SQLi in ReferencedTopSQLList, predict its execution time—PredictExecutionTime(SQLi). (See discussion below with reference to FIGS. 6A & 6B.)
  If:

$$\frac{ActualExecutionTime(SQLi) - PredictedExecutionTime(SQLi)}{PredictedExecutionTime(SQLi)} > Z\%$$

Add to PredictedBadSQLList(SQLi) 502 (FIG. 5)
  Get. PredictedBadSQLList
  3. Recalculate UUI based on PredictedBadSQLList
    3.1 For each SQLi in PredictedBadSQLList, Calculate Estimated Deviation for SQLi:

$$PredictedDeviation(SQLi) = \frac{(ActualExecutionTime(SQLi) - PredictedExecutionTime(SQLi))^2}{PredictedExecutionTime(SQLi)^2}$$

3.2 For each table $T_j$ in TableList, determine its Accumulative
    Predicted Deviation:
    If $T_j$ is referenced in SQLi:

AccumPredictedDeviation($T_j$)+=PredictedDeviation(SQLi)

3.3 For each data structure $T_k$ in TableList, recalculate its Update Urgency Index:

$$UUI(Tk)+ = \frac{CP4}{\sum_{h=1}^{n}(AccumPredictedDeviation(Th))} * PredictedDeviation(Tk)$$

4. Get updated CandidateList 315:

CandidateList={(T1,UUI(T1),(T2,UUI(T2)), ... (Tn, UUI(Tn)))

Figure 6B:
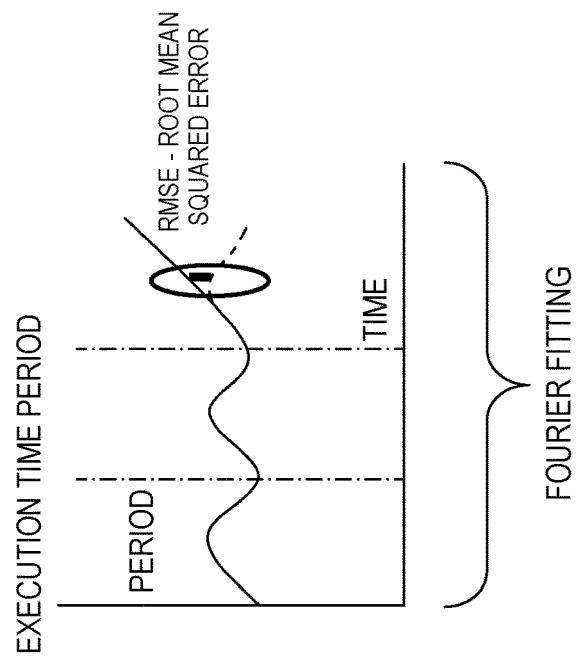
FIGS. 6A & 6B illustrate linear fitting and Fourier fitting, respectively, of query execution time data for facilitating predicting outdated quantitative data, in accordance with one or more aspects of the present invention.
Figure 6A:
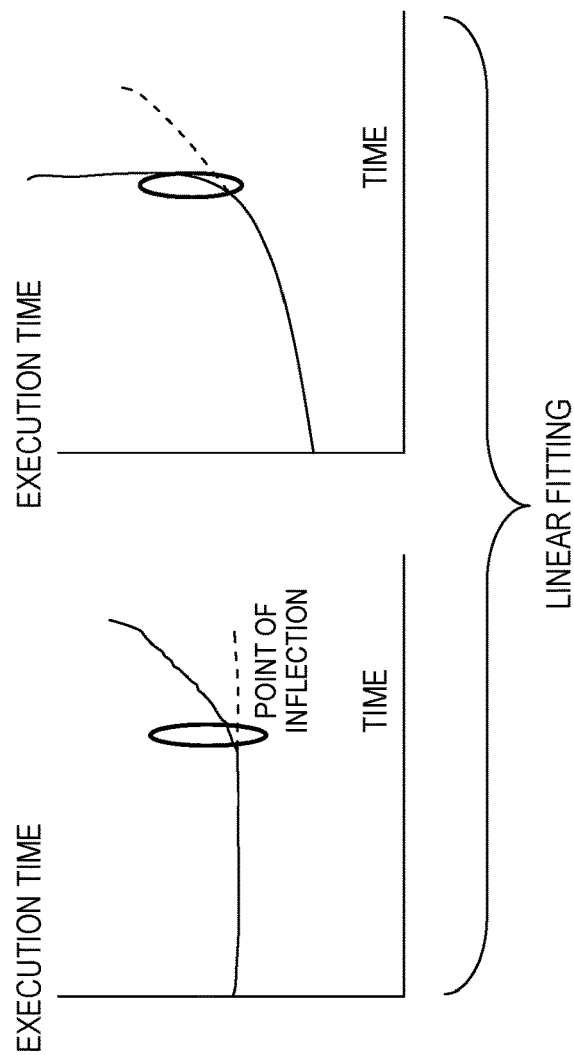

With reference to Step 2 above and FIGS. 6A & 6B, the execution time can be based on fitting respective time-series data to a regression algorithm, such as the linear-fitting algorithms of FIG. 6A, or the Fourier-fitting algorithm of FIG. 6B. By fitting the time-series data to the applicable algorithm, the point of inflection where execution time deviates from anticipated execution time can be predicted by the machine learning model(s). A point of inflection can be due to different reasons, with outdated quantitative data being one of the reasons, and the focus of the machine-learning-based, adaptive updating of quantitative data facility disclosed herein.

FIGS. 7A & 7B depict one embodiment of fitting tine-series data to the applicable regression algorithm using linear-fitting or Fourier-fitting.

As illustrated in FIG. 7A, the execution time for one or more execution sequences can be ascertained and used to predict the execution time for a sequence at issue. As one example:

Variables can be defined which include:
Execution Seq: (unix_timestamp of current execution–unix_timestamp of earliest execution in SQL cache system since last update of quantitative data) divided by 300 (for instance).
Execution Time: Average execution time for all executions that happened within "Execution Seq".

$$T_n = f(Seq_n).$$

The steps can include processes as depicted in FIG. 7B, including detecting periodicity 700. Periodicity detection can be performed by auto-correlation coefficients analysis 701 and can include, for instance, detecting periodicity every day 702, and whether there is a fail for, for instance, three times 703, detecting periodicity every week 704, and whether there is a fail for, for instance, 3 times 705, and detecting periodicity every month 706, and whether there is a fail. Based on the periodicity detecting, processing determines whether the execution time of the sequence is periodic 710, and if "yes", a Fourier-fitting algorithm 712 is used, while if "no", a linear-fitting algorithm 714 is used.

Returning to FIG. 3, once the CandidateList 315 is completed with the associated UUIs, the workflow includes merging (in one embodiment) the CandidateList with a CandidateList from a previous round or cycle of adaptive update processing to obtain a MergedCandidateList 320. Using the MergedCandidateList, processing determines whether to update the quantitative data 330, and if "yes", then the quantitative data facility or runner 331 is executed to obtain performance metrics or to indicate the performance metrics are to be obtained, for instance, at a more idle time of the database system. Any data structures having quantitative data updated are removed from the list, and the remaining data structures in the MergedCandidateList have their update urgency index reduced 340, for instance, by half, in one example, so as not to bias the next adaptive update cycle. The next adaptive update cycle 350 is commenced, which as noted, includes starting with collecting TableList1 and TableList2.

As noted, the machine-learning-based, adaptive updating of quantitative data facility disclosed herein determines whether to update quantitative data during any given update cycle, whether currently, or at a delayed time. A decision tree is implemented (in one embodiment) by the machine learning model(s) to direct this decision. In one example, the decision can utilize four attributes:

UUI Range—Divide (0, max(UUI)) into R (e.g., 24) ranges: (RangeA1, RangeA2, ... RangeA24}
Data Reads/s
 1. ReadsAvg=Avg(All Data Reads/s)
 2. For each Data Reads/s, $\delta$DataReads=Data Reads/s–ReadsAvg
 3. Divide (Min($\delta$DataReads), Max($\delta$DataReads)) into 24 ranges: (RangeB1, RangeB2, ... RangeB24)
Same for Data Writes/s: {RangeC1, RangeC2, ... RangeC24)
Completed Activities/s: Completed activities per second, indicates the databases's degree of busyness: (RangeD1, RangeD2, ... RangeD24).
Observing Results—The system collects (in one embodiment) performance metrics when and after updating of quantitative data, and also collects metrics when it decides not to proceed with an updating of quantitative data, such as an updating request.
When system decides to collect quantitative data:
 1. When statistics was updated, did the average execution time of SQLs decrease?
 2. Was there was a major transaction per second (TPS) drop during quantitative data updating?
When system decides not to collect quantitative data:
 3. Was there was a major transaction per second (TPS) drop observed after the system delayed an update request?

FIG. 8 depicts exemplary results of a performance metrics collector collecting attributes periodically and the system collecting performance metrics when and after updating of statistics, as well as metrics when a quantitative data collection update is delayed. In this manner, the machine learning model(s) continues to train when to update quantitative data within the database system based on collected attributes.

Advantageously, the machine-learning-based, adaptive updating of quantitative data in a database system disclosed herein implements a process of updating quantitative data, or statistics, adaptively and intelligently in the database based, for instance, on data changes and data reads, as well as query performance and system performance. The update of quantitative data occurs when necessary because the quantitative data update requirement is evaluated accurately with automatic optimization ability. Further, the updating of quantitative data can run automatically at the correct time, such as when query performance is already poor, or such as when query performance is likely to soon be poor, and/or at a time when collecting the quantitative data will have little influence on other executing database applications.

Other variations and embodiments are possible.

Figure 9A:
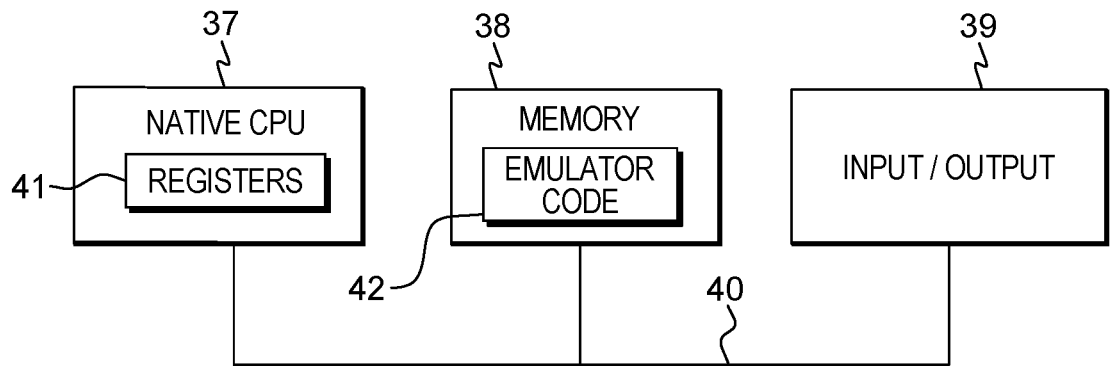
FIG. 9A depicts yet another example of a computing environment to incorporate and use one or more aspects of the present invention.

Another embodiment of a computing environment to incorporate and use one or more aspects of the present invention is described with reference to FIG. 9A. In this example, a computing environment 36 includes, for instance, a native central processing unit (CPU) 37, a memory 38, and one or more input/output devices and/or interfaces 39 coupled to one another via, for example, one or more buses 40 and/or other connections. As examples, computing environment 36 may include a Power® processor offered by International Business Machines Corporation, Armonk, New York; an HP Superdome with Intel® processors offered by Hewlett Packard Co., Palo Alto, California; and/or other machines based on architectures offered by International Business Machines Corporation, Hewlett Packard, Intel Corporation, Oracle, and/or others. PowerPC is a trademark or registered trademark of International Business Machines Corporation in at least one jurisdiction. Intel is a trademark or registered trademark of Intel Corporation or its subsidiaries in the United States and other countries.

Native central processing unit 37 includes one or more native registers 41, such as one or more general purpose registers and/or one or more special purpose registers used during processing within the environment. These registers include information that represents the state of the environment at any particular point in time.

Moreover, native central processing unit 37 executes instructions and code that are stored in memory 38. In one particular example, the central processing unit executes emulator code 42 stored in memory 38. This code enables the computing environment configured in one architecture to emulate another architecture. For instance, emulator code 42 allows machines based on architectures other than the z/Architecture instruction set architecture, such as Power processors, HP Superdome servers or others, to emulate the z/Architecture instruction set architecture and to execute software and instructions developed based on the z/Architecture instruction set architecture.

Figure 9B:
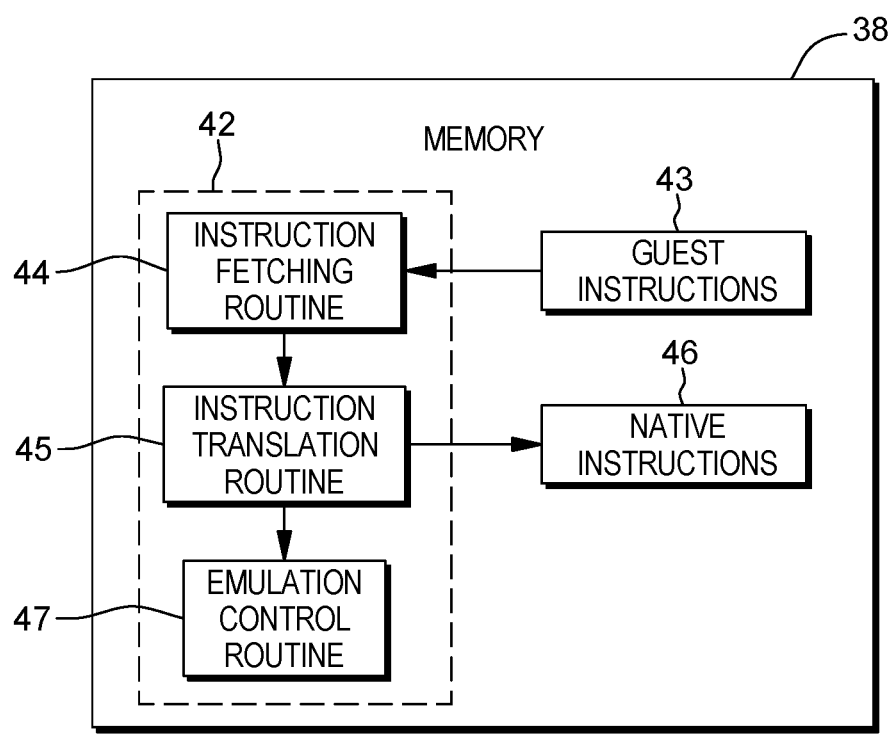
FIG. 9B depicts further details of the memory of FIG. 9A, in accordance with one or more aspects of the present invention.

Further details relating to emulator code 42 are described with reference to FIG. 9B. Guest instructions 43 stored in memory 38 comprise software instructions (e.g., correlating to machine instructions) that were developed to be executed in an architecture other than that of native CPU 37. For example, guest instructions 43 may have been designed to execute on a processor based on the z/Architecture instruction set architecture, but instead, are being emulated on native CPU 37, which may be, for example, an Intel processor. In one example, emulator code 42 includes an instruction fetching routine 44 to obtain one or more guest instructions 43 from memory 38, and to optionally provide local buffering for the instructions obtained. It also includes an instruction translation routine 45 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 42 includes an emulation control routine 47 to cause the native instructions to be executed. Emulation control routine 47 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 46 may include loading data into a register from memory 38; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 41 of the native CPU or by using locations in memory 38. In embodiments, guest instructions 43, native instructions 46 and emulator code 42 may reside in the same memory or may be disbursed among different memory devices.

The computing environments described above are only examples of computing environments that can be used. Other environments, including but not limited to, non-partitioned environments, partitioned environments, cloud environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
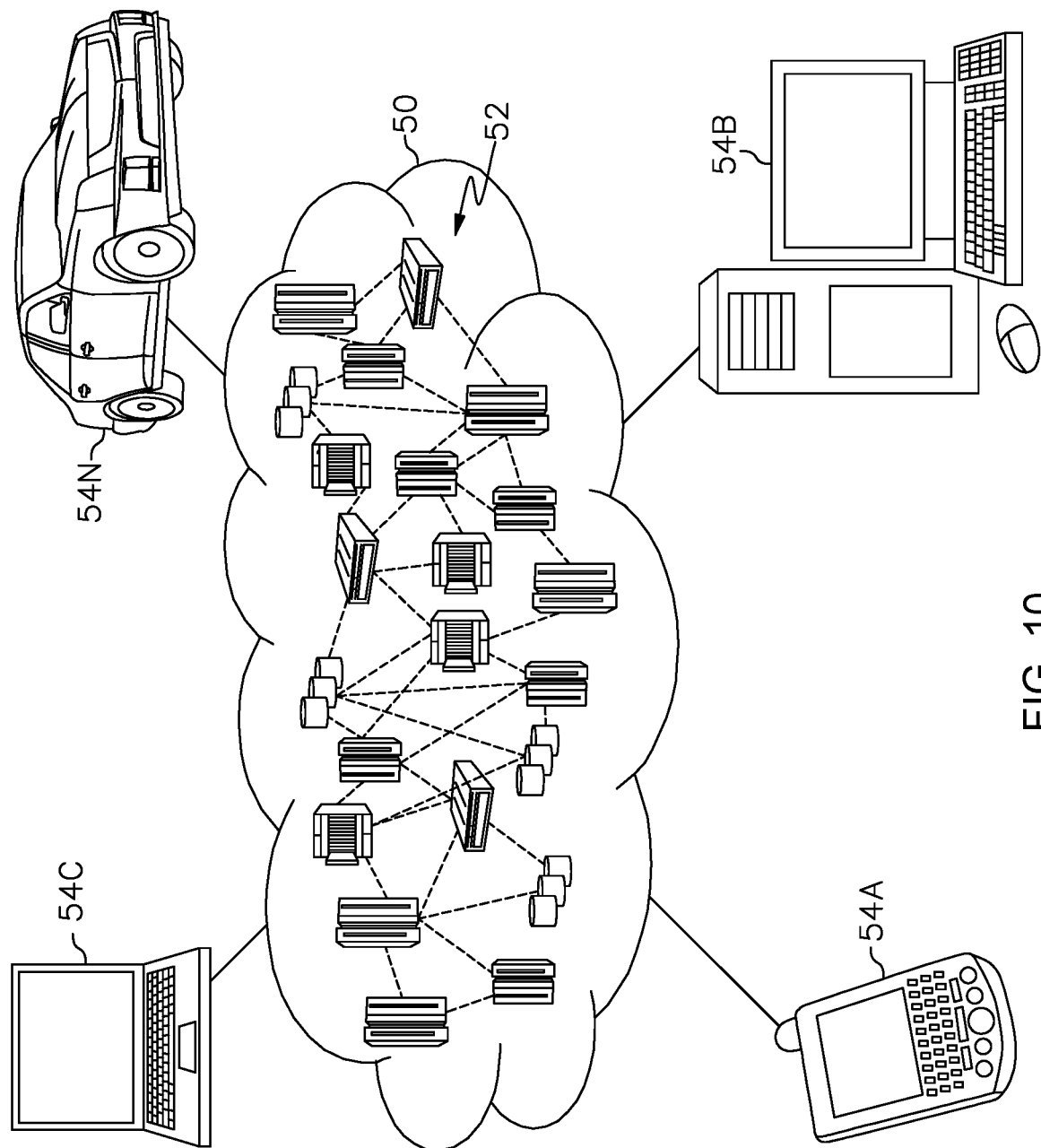
FIG. 10 depicts one embodiment of a cloud computing environment, in accordance with one or more aspects of the present invention.

Referring now to FIG. 10, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 52 and cloud computing environment 50 can communicate with any type of computerized device over any type of network and/or network addressable connection (e.g., using a web browser).

Figure 11:
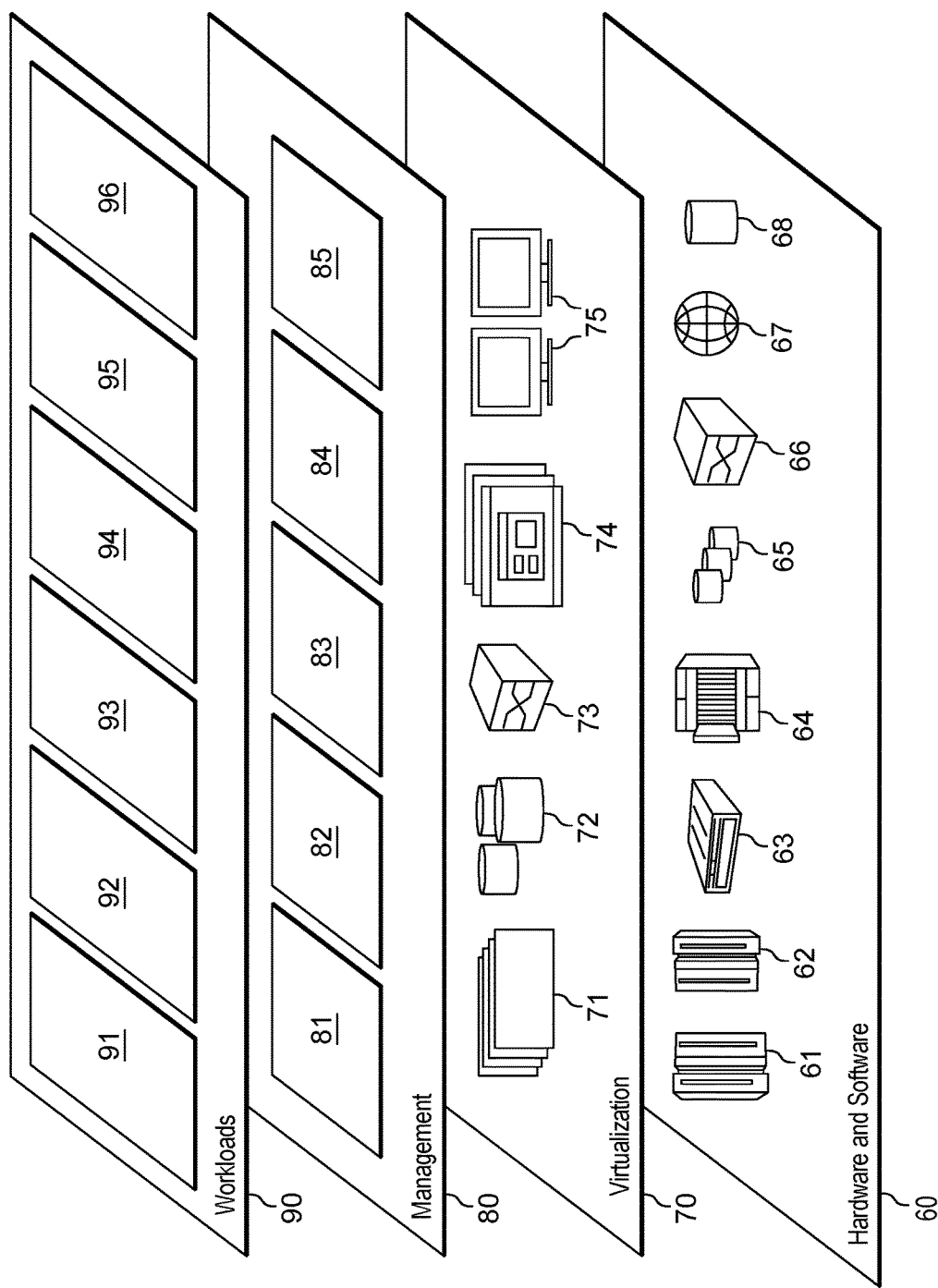
FIG. 11 depicts one example of abstraction model layers, in accordance with one or more aspects of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and adaptive updating of quantitative data processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For instance, computing environments of other architectures can be used to incorporate and/or use one or more aspects. Further, different instructions or operations may be used. Additionally, different types of registers and/or different registers may be used. Further, other data formats, data layouts and/or data sizes may be supported. In one or more embodiments, one or more general-purpose processors, one or more special-purpose processors or a combination of general-purpose and special-purpose processors may be used. Many variations are possible.

Various aspects are described herein. Further, many variations are possible without departing from a spirit of aspects of the present invention. It should be noted that, unless otherwise inconsistent, each aspect or feature described herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
    one or more computer-readable storage media having program instructions embodied therewith, the program instructions being readable by a processing circuit to cause the processing circuit to perform a method comprising:
        training one or more machine learning models to facilitate adaptively updating quantitative data in a database system;
        ascertaining an update urgency index for updating quantitative data for one or more data structures of the database system, the update urgency index being representative of an urgency for updating the quantitative data for the data structure(s) and being based, at least in part, on real-time query metrics;
        predicting, via the machine learning model(s), an execution time of one or more database queries to the data structure(s), wherein the real-time query metrics are based on a difference between the predicted execution time of the one or more database queries to the data structure(s) in comparison to an actual execution time of the one or more database queries to the data structure(s), and wherein the difference between the predicted execution time of the one or more database queries to the data structure(s) and the actual execution time of the one or more database queries to the data structure(s) exceeding a threshold predicts poor query performance, and increases the update urgency index to indicate an urgency for updating the quantitative data of the data structure(s) in the database system;
        adaptively updating, using the machine learning model(s), the quantitative data, the adaptively updating being based, at least in part, on the ascertained update urgency index; and
        optimizing processing of a database query in the database system using the adaptively updated quantitative data.

2. The computer program product of claim 1, wherein the real-time query metrics comprise a volume and frequency of database queries to the data structure(s) in the database system.

3. The computer program product of claim 1, wherein the real-time query metrics are based, at least in part, on collecting M top-most database queries to the data structure(s) in order of processor usage for a time interval and estimating therefor a deviation in usage from an estimated processor usage for the M top-most database queries, the estimated deviation being representative of a performance deviation of the M top-most database queries, where $M \geq 1$.

4. The computer program product of claim 1, wherein the predicting, by the machine learning model(s), the execution time for the one or more database queries uses regression analysis based on time series data.

5. The computer program product of claim 1, wherein the adaptively updating comprises adaptively updating the quantitative data based on a relative urgency of the ascertained update urgency index, the adaptively updating including currently proceeding with updating of the quantitative data where the ascertained update urgency index indicates updating of the quantitative data is urgent, and delaying proceeding with updating of the quantitative data where the ascertained update urgency index indicates that the updating is not urgent.

6. The computer program product of claim 1, further comprising identifying a list of data structures for which the update urgency index is to be ascertained, the one or more data structures being in the list of data structures, the list of data structures including any data structures with major data changes since a last updating of quantitative data, any data structures with no quantitative data, and any data structures with stale quantitative data.

7. The computer program product of claim 6, further comprising predictively identifying, by the machine learning model(s), a data structure in the database system with degrading query execution performance, wherein the list of data structures further includes the predictively identified data structure with degrading query execution performance.

8. A computer system for facilitating processing within a computing environment, the computer system comprising:
    a memory; and
    a processing circuit in communication with the memory, wherein the computer system is configured to perform a method, the method comprising:
        training one or more machine learning models to facilitate adaptively updating quantitative data in a database system;
        ascertaining an update urgency index for updating quantitative data for one or more data structures of the database system, the update urgency index being representative of an urgency for updating the quantitative data for the data structure(s) and being based, at least in part, on real-time query metrics;
        predicting, via the machine learning model(s), an execution time of one or more database queries to the data structure(s), wherein the real-time query metrics are based on a difference between the predicted execution time of the one or more database queries to the data structure(s) in comparison to an actual execution time of the one or more database queries to the data structure(s), and wherein the difference between the predicted execution time of the one or more database queries to the data structure(s) and the actual execution time of the one or more database queries to the data structure(s) exceeding a threshold predicts poor query performance, and increases the update urgency index to indicate an urgency for updating the quantitative data of the data structure(s) in the database system;
        adaptively updating, using the machine learning model(s), the quantitative data, the adaptively updating being based, at least in part, on the ascertained update urgency index; and
        optimizing processing of a database query in the database system using, at least in part, the adaptively updated quantitative data.

9. The computer system of claim 8, wherein the real-time query metrics comprise a volume and frequency of database queries to the data structure(s) in the database system.

10. The computer system of claim 8, wherein the real-time query metrics are based, at least in part, on collecting M top-most database queries to the data structure(s) in order of processor usage for a time interval and estimating therefor a deviation in usage from an estimated processor usage for the M top-most database queries, the estimated deviation being representative of a performance deviation of the M top-most database queries, where $M \geq 1$.

11. The computer system of claim 8, wherein the predicting, by the machine learning model(s), the execution time for the one or more database queries uses regression analysis based on time series data.

12. The computer system of claim 8, further comprising identifying a list of data structures for which the update urgency index is to be ascertained, the one or more data structures being in the list of data structures, the list of data structures including any data structures with major data changes since a last updating of quantitative data, any data structures with no quantitative data, and any data structures with stale quantitative data.

13. A computer-implemented method of facilitating processing within a computing environment, the computer-implemented method comprising:
    training one or more machine learning models to facilitate adaptively updating quantitative data in a database system;
    ascertaining an update urgency index for updating quantitative data for one or more data structures of the database system, the update urgency index being representative of an urgency for updating the quantitative data for the data structure(s) and being based, at least in part, on real-time query metrics;
    predicting, via the machine learning model(s), an execution time of one or more database queries to the data structure(s), wherein the real-time query metrics are based on a difference between the predicted execution time of the one or more database queries to the data structure(s) in comparison to an actual execution time of the one or more database queries to the data structure(s), and wherein the difference between the predicted execution time of the one or more database queries to the data structure(s) and the actual execution time of the one or more database queries to the data structure(s) exceeding a threshold predicts poor query performance, and increases the update urgency index to indicate an urgency for updating the quantitative data of the data structure(s) in the database system;
    adaptively updating, using the machine learning model(s), the quantitative data, the adaptively updating being based, at least in part, on the ascertained update urgency index; and
    optimizing processing of a database query in the database system using, at least in part, the adaptively updated quantitative data.

14. The computer-implemented method of claim 13, wherein the real-time query metrics comprise a volume and frequency of database queries to the data structure(s) in the database system.

15. The computer-implemented method of claim 13, wherein the real-time query metrics are based, at least in part, on collecting M top-most database queries to the data structure(s) in order of processor usage for a time interval and estimating therefor a deviation in usage from an estimated processor usage for the M top-most database queries, the estimated deviation being representative of a performance deviation of the M top-most database queries, where $M \geq 1$.

* * * * *